United States Patent
Yu et al.

(10) Patent No.: US 9,509,898 B2
(45) Date of Patent: Nov. 29, 2016

(54) SYSTEM AND METHOD FOR AUTOMATIC FOCUSING BASED ON STATISTICAL DATA

(71) Applicant: SZ DJI TECHNOLOGY CO., LTD., Shenzhen, Guangdong (CN)

(72) Inventors: Lifu Yu, Guangdong (CN); Zisheng Cao, Guangdong (CN)

(73) Assignee: SZ DJI TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/972,889

(22) Filed: Dec. 17, 2015

(65) Prior Publication Data
US 2016/0105601 A1   Apr. 14, 2016

Related U.S. Application Data (63) Continuation of application No. PCT/CN2014/087546, filed on Sep. 26, 2014.

(51) Int. Cl.
| H04N 5/232 | (2006.01) |
| H04N 5/369 | (2011.01) |
| G06T 7/00 | (2006.01) |

(52) U.S. Cl.
CPC .......... *H04N 5/23212* (2013.01); *G06T 7/004* (2013.01); *H04N 5/3696* (2013.01)

(58) Field of Classification Search
CPC ................................................. H04N 5/23212
See application file for complete search history.

(56) References Cited

U.S. PATENT DOCUMENTS

| 2003/0063212 A1 | 4/2003 | Watanabe et al. |
| 2007/0268417 A1 | 11/2007 | Kato et al. |
| 2008/0316352 A1 | 12/2008 | Cheng et al. |
| 2010/0129002 A1* | 5/2010 | Samurov ............ H04N 5/23293 382/255 |
| 2012/0106937 A1* | 5/2012 | Molin ................ H04N 5/23212 396/121 |
| 2013/0093941 A1 | 4/2013 | Itoh |
| 2014/0104300 A1 | 4/2014 | Kiuchi |
| 2015/0146079 A1* | 5/2015 | Kim ................... H04N 5/23293 348/345 |

(Continued)

FOREIGN PATENT DOCUMENTS

| CN | 101625452 A | 1/2010 |
| CN | 102087460 A | 6/2011 |
| CN | 102253569 A | 11/2011 |
| CN | 103424953 A | 12/2013 |

(Continued)

OTHER PUBLICATIONS

WO, International Search Report and Written Opinion, PCT/CN2014/087546, Jul. 2, 2015.

*Primary Examiner* — W B Perkey
(74) *Attorney, Agent, or Firm* — Orrick, Herrington & Sutcliffe, LLP (57) ABSTRACT

A system for automatic focusing with a lens and methods for making and use the same are provided. When performing a focusing operation, a controller calculates a focus measure value for each lens position of a plurality of lens positions. The focus measure values are calculated based on each of the window evaluation values and a respective weight for image focusing windows within a set of image focusing windows. The controller then compares the calculated focus measure values of the plurality of lens positions in order to select an optimal lens position. The set of image focusing windows can be selected based on one or more sets of image focusing window selection rules derived from statistical data. In addition, the respective weights for image focusing windows can also be calculated based on the statistical data.

28 Claims, 8 Drawing Sheets

(56) References Cited

U.S. PATENT DOCUMENTS

2016/0037052 A1* 2/2016 Brunner ............ H04N 5/23212
348/353
2016/0105601 A1* 4/2016 Yu ...................... H04N 5/23212
348/349

FOREIGN PATENT DOCUMENTS

| CN | 104023175 A | 9/2014 |
|---|---|---|
| EP | 0379808 A1 | 8/1990 |
| EP | 1737216 A1 | 12/2006 |
| WO | WO 2012/116347 A1 | 8/2012 |

* cited by examiner

SYSTEM AND METHOD FOR AUTOMATIC FOCUSING BASED ON STATISTICAL DATA

CROSS-REFERENCE TO RELATED APPLICATIONS

This application is a continuation of, and claims priority to, copending PCT Patent Application Number PCT/CN2014/087546, which was filed on Sep. 26, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging systems and methods, and more particularly, but not exclusively, to a system and method for automatic focusing by selecting a set of lens focusing windows and calculating a weighted window evaluation value for the set of lens focusing windows based on statistical data.

BACKGROUND

Many imaging devices are equipped with functionalities of automatic focusing, where a focusing process is performed without any intervention by an operator of a device. Typical imaging devices include cameras, video recorders and other devices with image taking or recording capabilities, such as smart mobile phones.

Taking a camera as an example, when a photograph is being taken, a first step is to focus on an object being photographed. Some cameras are equipped with automatic focusing functionality. When automatically focusing on an object in photographing or video recording, one image frame can be divided into three image regions: main imaging region, secondary imaging region and background imaging region. The main purpose for focusing is to make the image within the main imaging region as clear as possible.

In a focusing process, a lens can be regarded as a convex lens. For a certain focus value of a zoom lens or for a fixed-focus lens, a focus distance is fixed. The relationship of an object distance, an image distance and an focus distance can be represented as follows:

$$\frac{1}{u} + \frac{1}{v} = \frac{1}{f} \qquad \text{Equation (1)}$$

wherein, u refers to the object distance, v refers to the image distance and f refers to the focus distance. We can see from the above descriptions, when the focus distance and object distance are fixed, the main purpose for focusing is to change the image distance in order for it to satisfy Equation (1).

For a specific image, space depths for its main imaging region, its secondary imaging region and its background region are different, i.e. the object distances for those three are different. Therefore, at a specific time and with a certain focus distance, the image distance can only be adjusted to satisfy Equation (1) with respect to the image distance of only one region.

In order to obtain a picture with a clear main imaging region, the main imaging region should be correctly found and should be precisely located within a proper dimensioned focusing window, so as to let it focus precisely.

In existing technologies, popular methods for selecting image focusing windows include center selection approach and multi-region selection approach. Between the two, center selection approach is to take a small region of M*N pixels in the center of an image frame as a focusing window. Multi-region selection approach is to take a plurality of representative regions as image focusing windows, e.g. regions with M*N pixels centered with four dividing points along a horizontal axis or a vertical axis. Multi-region selection approach can also take regions with M*N pixels centered with four dividing points along two diagonal lines as image focusing windows.

Several issues exist in such typical systems when an imaging device is focusing an image. First of all, the main imaging region does not always falls into one of the above described regions. In some circumstances, the main imaging region is located in the above described regions and the purpose of precise focusing can be achieved in those circumstances. However, when the main imaging region is not within the above described regions, the above described approaches for focusing window are unable to guaranty a picture with clear main imaging region. Second, when the area of a focusing window is greater the main imaging region, the existing approaches not only increase the amount of calculations, they can also deteriorate the final results of focusing. The reason for the deterioration is because they cause the focusing evaluation curves not sharp enough at the transition or joint places.

Therefore, there is a need for a system and method for automatically selecting image focusing windows, which can control the amount of calculations and guaranty a sharp focusing evolution curve.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 1:
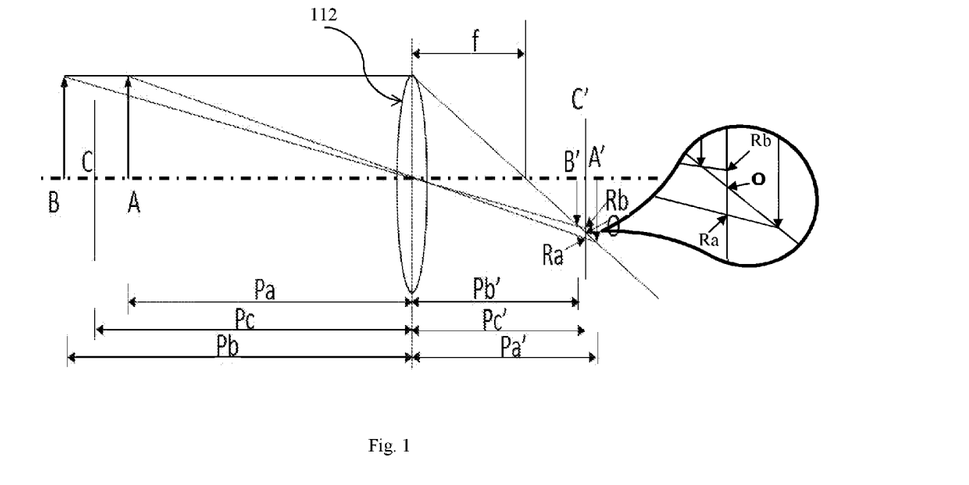
FIG. 1 is an illustrative diagram showing imaging relationships of a main object and a background through an optical lens.

To address the issues as set forth in the background information, the present disclosure is deduced from the following relationships, as illustrated in FIG. 1:

$$\frac{1}{Pa} + \frac{1}{Pa'} = \frac{1}{f} \qquad \text{Equation (2)}$$

$$\frac{1}{Pb} + \frac{1}{Pb'} = \frac{1}{f} \qquad \text{Equation (3)}$$

wherein Pa represents the object distance between a main imaging object A and a lens 112; Pb represents the object distance between a background object B and the lens 112; Pa' represents the image distance between the lens 112 and an image A' formed by the main imaging object A; Pb' represents the image distance between the lens 112 and an image B' formed on a sensor by the background imaging object B; and f represents the focus distance of the lens 112.

For an image frame of M*N pixels, we define an average evaluation function ME(I) as follows:

$$ME(I) = \frac{E(I)}{MN} \qquad \text{Equation (4)}$$

wherein, E(I) is a general focusing evaluation function; and I represents an image being processed, and MN refers to a total number of pixels within the area of the image frame.

We can conclude from Equation (4) that ME(I) has the same properties as E(I), which properties include:

a. the function is a unimodal function for calculating a curve of a series of images of a single imaging object with its maximum value corresponding to its clearest image;

b. the function monotonically increases or monotonically decreases at either side of a peak of the curve; and c. the absolute values of the slope rates at either side of the peak of the curve ought to be greater.

Now, we further assume that FIG. 1 illustrates an imaging scenario within a focusing window, and a. an image I within the focusing window includes M*N pixels, and the image consists of a main imaging region A' and a background imaging region B';

b. Pa represents the distance of a main imaging object A to a lens 112, and Pb represents the distance of a background object B to the lens 112; and c. during an imaging process, the object distance of the main imaging object A and object distance of the background object B are maintained in reasonable distances and kept constant.

Then, Equation (4) can be further deduced as follows:

$$\begin{aligned}ME(I) &= \frac{E(I)}{MN} \\ &= \frac{1}{MN}[S(A')^*ME(A') + S(B')^*ME(B')] \\ &= p^*ME(A') + (1-p)^*ME(B')\end{aligned} \qquad \text{Equation (5)}$$

wherein, S(A') represents the area of the main imaging region A', i.e. the number of pixels in the main imaging region A'; S(B') represents the area of the background region B', i.e. the number of pixels in the background imaging region B'; p represents the ratio of the main imaging region A's to the whole area of the M*N image defined by the focusing window.

With Equation (5), we can get that the average evaluation function ME(I) consists of a weighted pixel average function for both main imaging region function and background imaging region function. The weight values are directly proportional to the number of pixels within respective regions. In addition, the weight for the main imaging region and the weight for the background can be mutually exclusive. The relationships among the averaging function for all image pixels, the averaging evaluation function for the main imaging region, the averaging evaluation function for the background imaging region are illustrated in FIG. 2.

Figure 2:
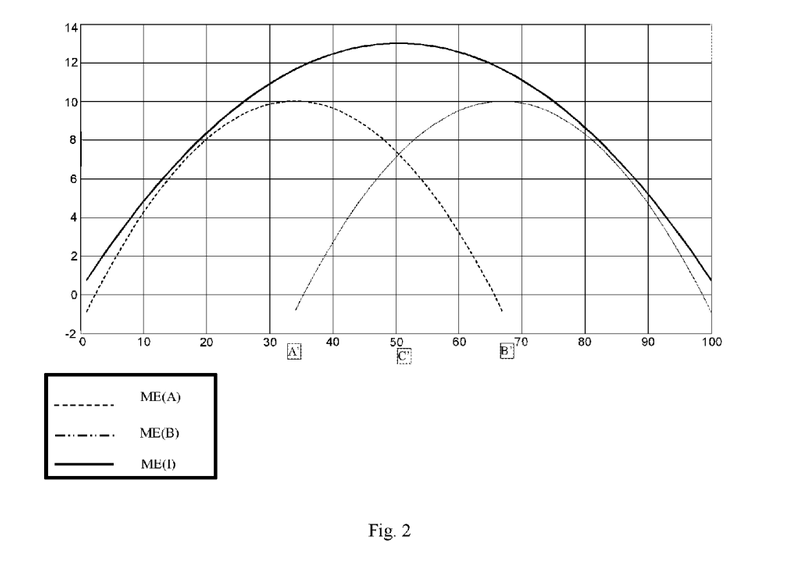
FIG. 2 is an illustrative diagram showing average focus values for the pixels within a main imaging region, and average focus values for the pixels within a background region and their relationships with average focus values for the total pixels in an image frame.

Referring to FIG. 2, when the imaging sensor is at A' or B', ME(A') or ME(B') achieves its maximum value respectively. If p does not equal to 1, ME(I) can achieve its maximum value only when the imaging sensor is at C', which is between A' and B'. In this case, if the imaging sensor is within C' plane, neither the main imaging object nor the background object can be precisely focused. Now, the object that can be precisely focused in within C plane as shown in FIG. 1.

Assuming, in FIG. 1, R is the radius of a lens 112, ra and rb (not shown) represent fuzzy radii corresponding to one point of the out-of-focus images obtained from between the main imaging object A and the background imaging object B when the imaging sensor is at C'. Then, $$ra = ORa = \frac{|Pa' - Pc'|}{Pa'}R \qquad \text{Equation (6)}$$

$$rb = ORb = \frac{|Pb' - Pc'|}{Pb'}R \qquad \text{Equation (7)}$$

From the above Equations (5), (6) and (7) we know, the greater the p value, i.e. the bigger the ratio of the main imaging region A's to the whole imaging area of the M*N image within the focusing window, the bigger the ratio of ME(A') with respect to ME(I). As shown in FIG. 2, the closer the peak point of ME(I) to A', i.e. the value of |Pa'−Pc'| is less, and therefore, the less the fuzzy radius ra will be, which means the image within the main imaging region is clearer.

To conclude, a purpose of selecting image focusing windows is to make the ratio between the pixel number within the main imaging region and the total number of pixels within the focusing window as great as possible. Under some embodiments disclosed herein, selections of image focusing windows can be accomplished based on statistical data to increase a possibility to make the ratio as great as possible.

As an exemplary example for selection of image focusing windows, adjuvant composition lines are considered. Based on statistical data conducted toward a camera 100, we select a center region $A_0$ and four regions $A_1, A_2, A_3$ and $A_4$, which are centered at intersections of two horizontal trisecting lines and two vertical trisecting lines of an image. Meanwhile, considering the statistic features of appearances of the main imaging regions in those five regions, we assume the weight for the center region is $\omega_0$, and the weights for the other four regions are $\omega_1, \omega_2, \omega_3$ and $\omega_4$ respectively.

When a focus position of the lens 112 is j, an average focus measure values for pixels within the focusing window can be represented as:

$$ME(I_j) = \frac{\sum_{i=0}^{4} \omega_i * E(A_{ij})}{\sum_{i=0}^{4} S(A_{ij})} \qquad \text{Equation (8)}$$

According to a property of the focus evaluation function "c. the absolute value of the slope rate at either side of the peak ought to be greater", following evaluation index can be obtained:

$$\sqrt{\int \left(\frac{dME}{dx}\right)^2} = \sqrt{\sum_{j=1}^{N} \left(\frac{ME(I_j) - ME(I_{j-1})}{x_j - x_{j-1}}\right)^2} \qquad \text{Equation (9)}$$

As described above, the purpose is to get a maximum value for the index represented in Equation (9).

Statistically, through a series of focus evaluations toward various focused images at different positions within the main imaging region, five weight values are identified: $\omega_0=0.38$, $\omega_1=0.18$, $\omega_2=0.14$, $\omega_3=0.17$, $\omega_4=0.13$.

Figure 3:
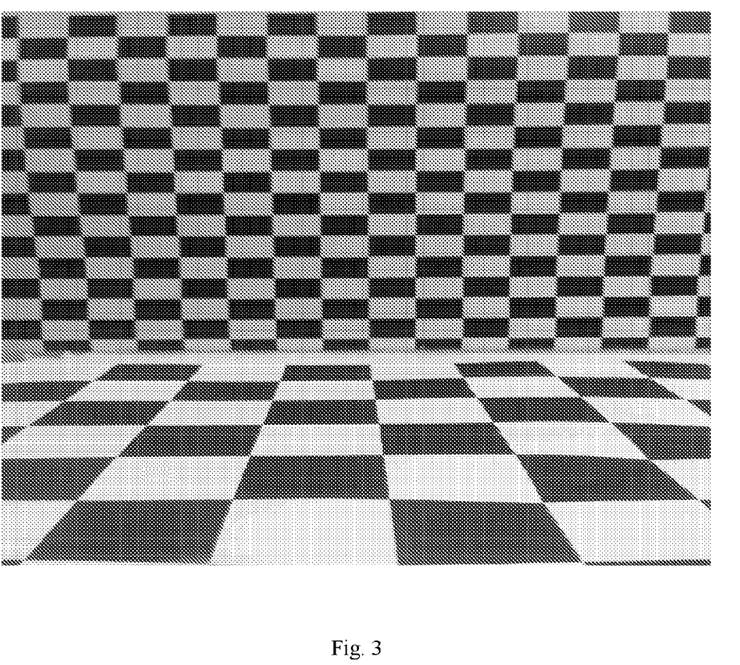
FIG. 3 is an illustrative diagram showing an actual object and its background.
Figure 4:
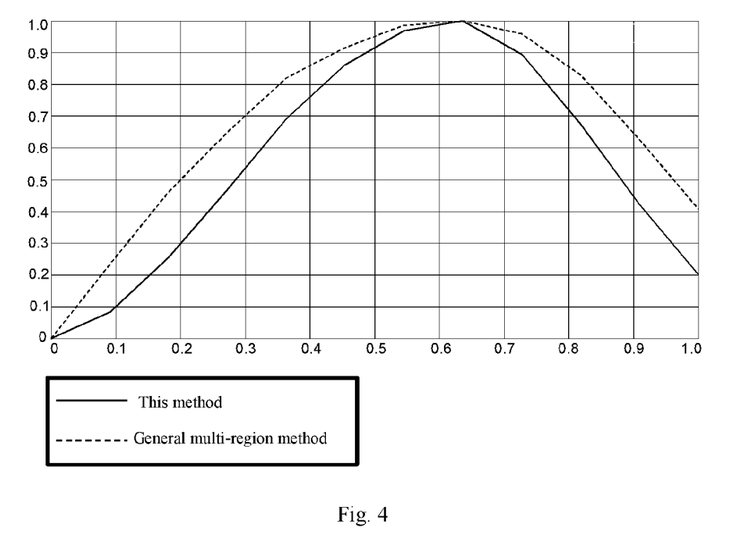
FIG. 4 is an illustrative diagram showing result difference between an approach under the present disclosure and a traditional multi-region approach.

According to the above exemplary indexes, an approach disclosed herein and a general multi-region selection approach are applied respectively to curve their focus evaluation functions against the object shown in FIG. 3. The results are illustrated in FIG. 4, which shows the result focus curve by the approach under this disclosure is much sharper than the focus curve obtained by the general multi-region selection approach.

Figure 5:
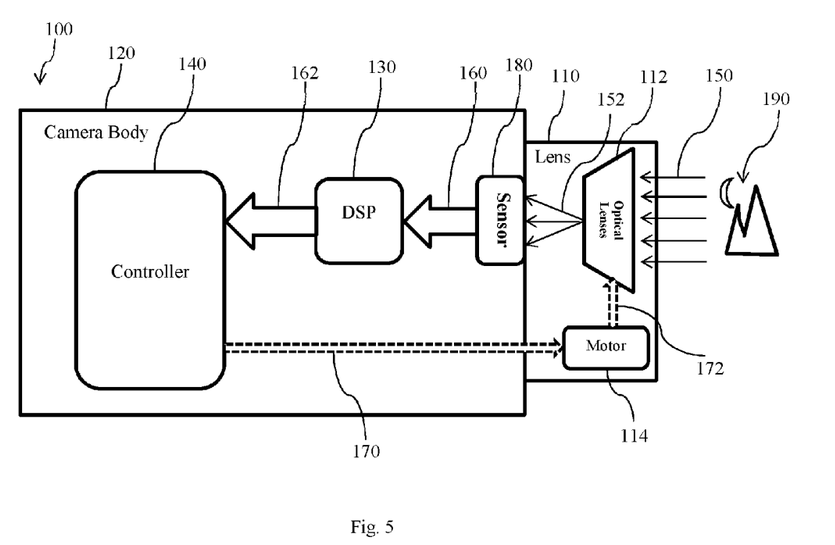
FIG. 5 is an exemplary top-level block diagram illustrating an embodiment of a camera with an automatic focusing capacity by selecting image focusing windows and calculating focus measure values.

The above described automatic focusing approach is implemented with a camera 100 shown in FIG. 5. In FIG. 5, a camera 100 is illustrated as having a camera body 120 and a lens 110 that can be either a zoom lens or a prime lens. The lens 110 includes a set of optical lenses 112 and a motor 114 configured to control positions of the set of optical lenses 112 in order to adjust an image distance, through a lens position, between the set of optical lenses 112 and a sensor 180. The optical lenses 112 receive light 150 that represents an object 190, which may include a main imaging object and a background. The light 150 is refracted through the set of optical lenses 112 to form an image on the sensor 180 via a light signal 152. The sensor 180 converts the light signal 152 from the lenses 112 into an analogue dataflow 160, which is then converted into a digital dataflow 162 by a Digital Signal Processor (DSP) 130. The digital data in the dataflow 162 is passed to a controller 140, which performs focus measure value calculations and comparisons as set forth above. The focus measure calculations also include calculations of window evaluation values. The controller 140 sends a control signal 170 to the motor 114 for changing the position of the lenses 112 in order to change the image distance between the set of optical lenses 112 and the sensor 180. The image is transmitted via the dataflow 160 to the DSP 130, which generates the dataflow 162 to the controller 140. The controller 140 calculates the focus measure values according to the new image data. This process forms a close-loop control system for focusing the image.

The controller 140 calculates and compares the focus measure values for a number of lens positions and selects one motor 114 position, or a lens position, that corresponds to an optimal focus measure value.

Figure 6:
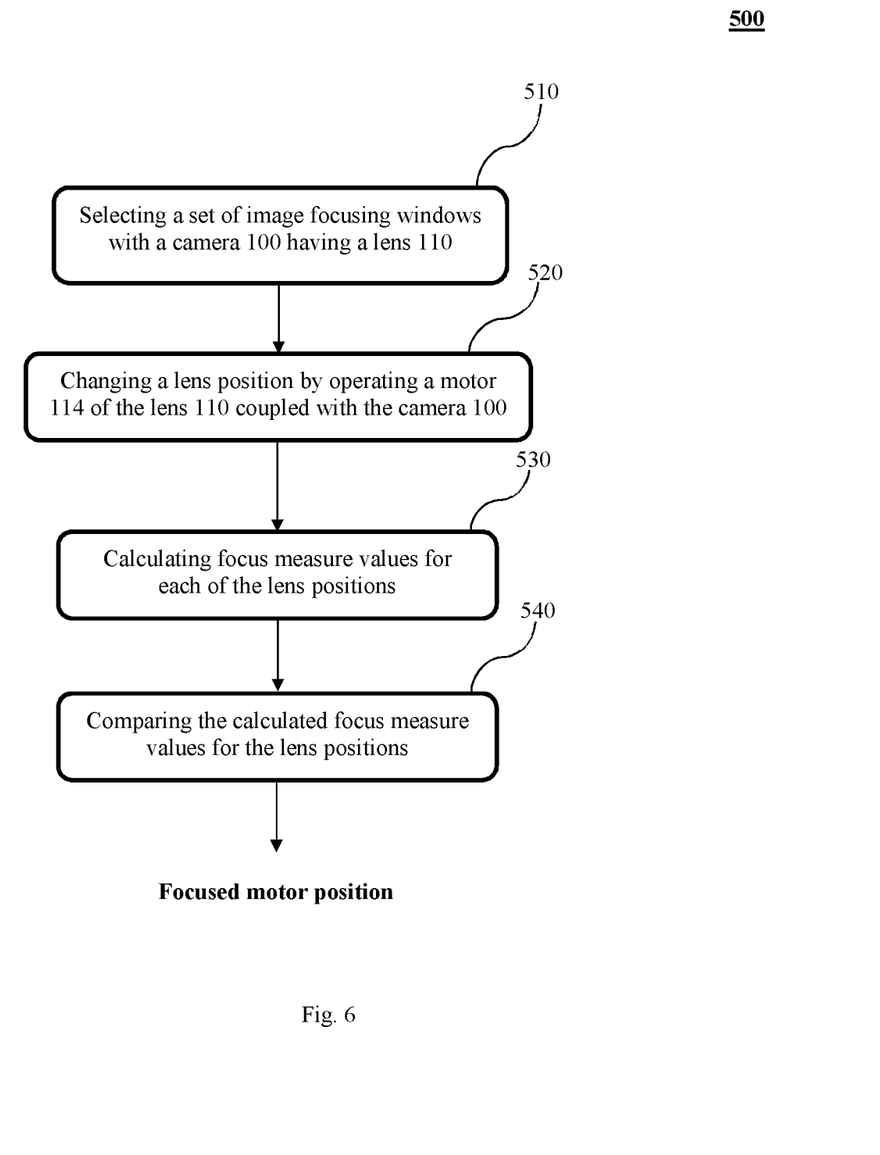
FIG. 6 is an exemplary top-level flowchart illustrating an embodiment of a method for automatic focusing of FIG. 5.

Now, one manner by which the camera 100 (shown in FIG. 5) processes an image is illustrated in FIG. 6, which shows a method 500 for enabling the camera 100 to automatically perform image focusing operations. Firstly, the controller 140 (shown in FIG. 5) can select a set of image focusing windows at 510 for calculating focus measure values and determining a lens position when focusing. Unlike the existing approaches as set forth in the background information, the embodiments disclosed herein can select image focusing windows based on statistical data. When a set of image focusing windows are selected for focusing an image frame, the controller 140 changes, at 520, the lens position by operating the motor 114 (shown in FIG. 5) of the lens 110 (shown in FIG. 5) coupled to the camera 100 (shown in FIG. 5). For each such lens position, the controller 140 memorizes its motor 114 position and calculates window evaluation values for each of the selected image focusing windows at 530. Also at 530, the controller 140 calculates focus measure values for each of the lens positions based on the calculated window evaluation values and respective weights for each of the image focusing windows. The calculated focus measure values are used for indicating whether an object is focused, where a greater focus measure value represents a clearer image. The weights for each of the image focusing windows are determined by statistical data specific to the camera 100 and the lens 110 coupled to the camera 100. The focus measure values are compared at 540 to determine an optimal lens position for the lens 110 and its corresponding motor 114 position.

Figure 7:
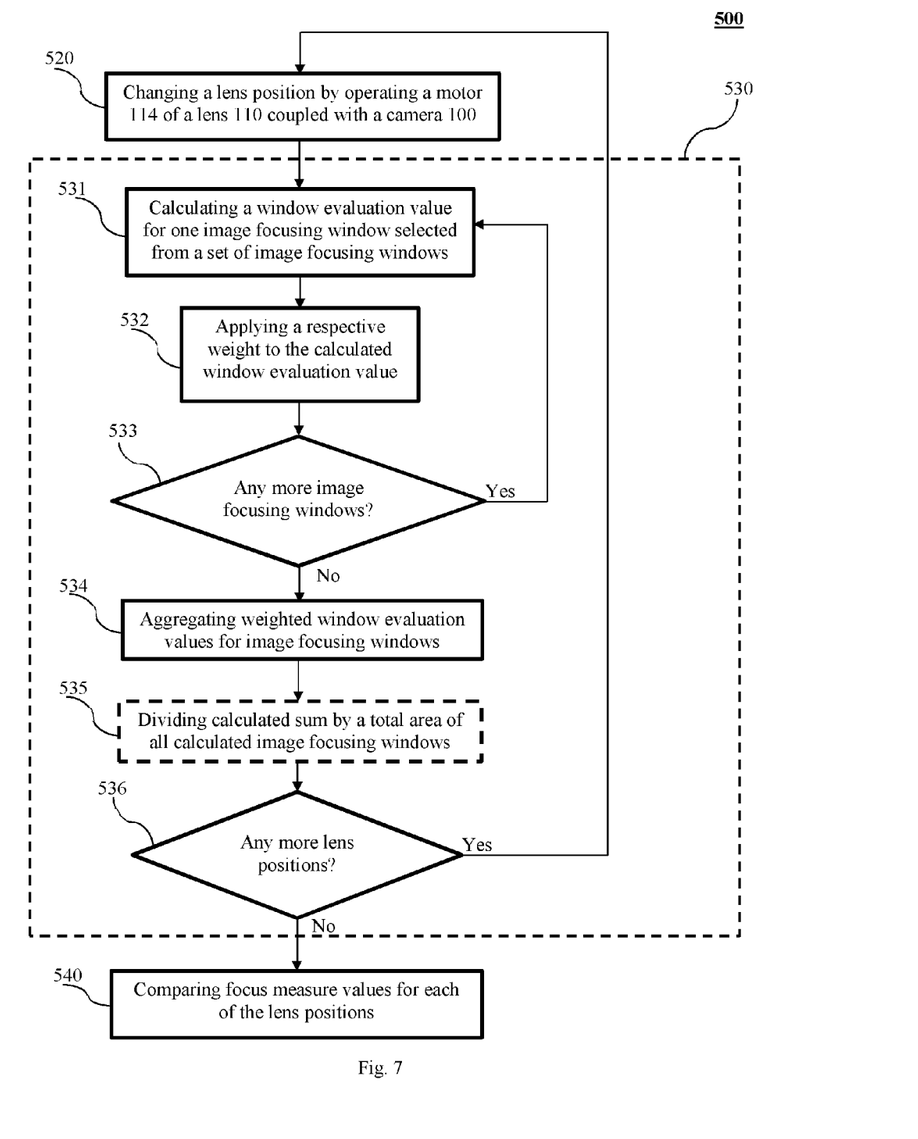
FIG. 7 is an exemplary flowchart illustrating an alternative embodiment of the method of FIG. 6, wherein details are added to illustrate an implementation embodiment of calculating a focus measure value for each lens position.

FIG. 7 shows an alternative embodiment of the method 500 with articulated functional block 530. After changing a lens position by operating the motor 114 (shown in FIG. 5), the controller 140 (shown in FIG. 5) calculates a window evaluation value for one image focusing window, at 531. The calculated window evaluation value, at 532, for the image focusing window can be applied with a respective weight that is specific to the image focusing window to provide a weighted window evaluation value for the image focusing window. Then, at 533, the controller 140 checks whether window evaluation values are calculated for all selected image focusing windows. If not all image focusing windows are calculated, the controller 140 moves to next image focusing window and calculates the window evaluation value for that image focusing window as described earlier in this paragraph. If all selected image focusing windows are calculated, the controller 140 sums the weighted window evaluation values for selected image focusing windows to provide a weighted sum of window evaluation values for the lens position. In another embodiment, functional blocks 532 and 534 can be combined into a new functional block 534. In that case, the respective weights are applied when aggregating up the window evaluation values for select image focusing windows to provide a weighted sum of window evaluation values in a single step.

In some other embodiments of the method 500, the controller 140 further divides, at 535, the weighted sum of window evaluation values by a total area of the calculated image focusing windows to get an average weighted sum of window evaluation values. The controller 140 thereby can advantageously take the average weighted sum of window evaluation values as the focus measure value. In an alternative embodiment of the method 500, the controller 140 can utilize the weighted sum of window evaluation values as the focus measure value. In other words, functional block 535 is optional and can be omitted from the method 500.

The controller then checks whether all selected lens positions have been calculated; if not, the controller 140 changes the lens position by operating the motor 114 (shown in FIG. 5) and calculates another focus measure value as described above. If all selected lens positions have been calculated, the controller compares the focus measure values to get an optimal lens position that corresponds to an optimal motor position.

Figure 8:
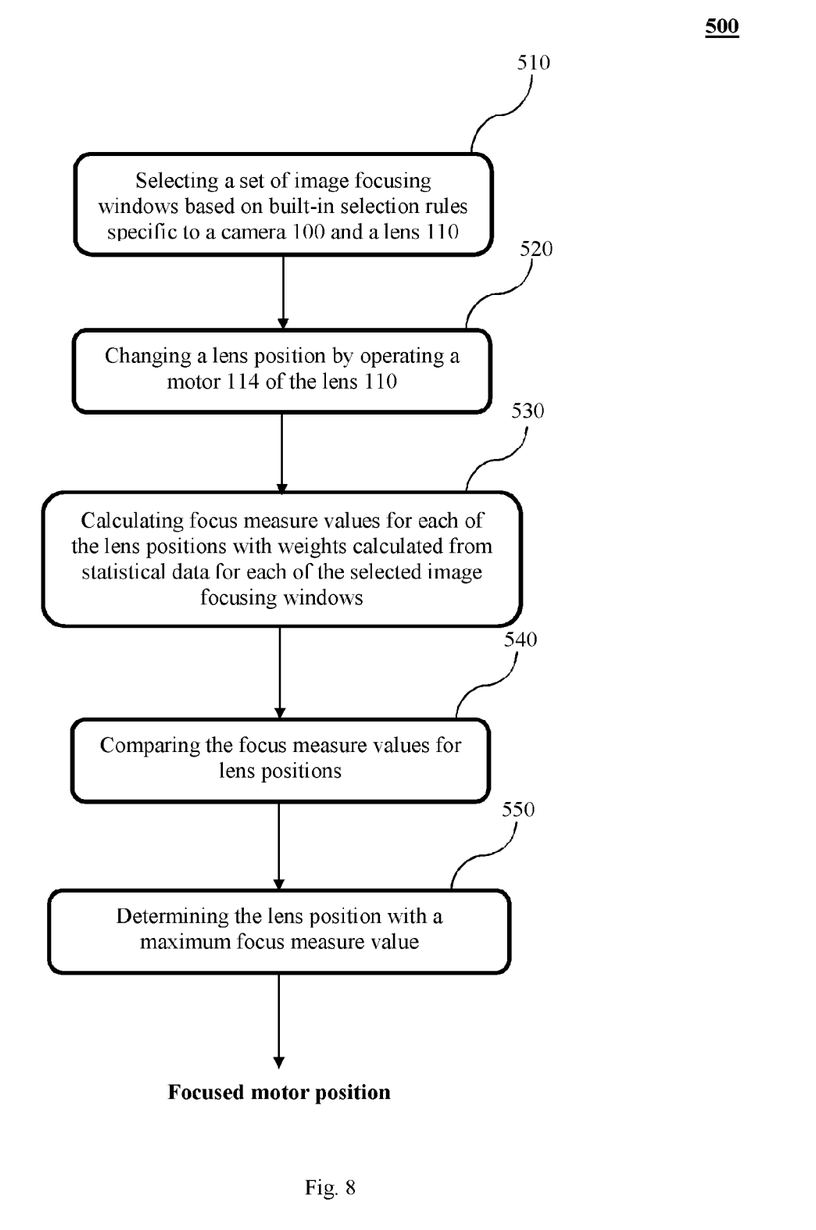
FIG. 8 is an exemplary flowchart illustrating an alternative embodiment of the method of FIG. 6, wherein details are added to illustrate the distinctive features of the method of the present disclosure.

An alternative embodiment of the method 500 of FIG. 6 or FIG. 7 is illustrated in FIG. 8. As shown in FIG. 8, the selection of image focusing windows, at 510, can be conducted based on one or more sets of built-in rules. The built-in rules can be derived from statistical data specific to the camera 100 (shown in FIG. 5) and/or specific to the lens 110 (shown in FIG. 5) coupled to the camera 100. In addition, at 530, when calculating a focus measure value, the weights (shown in FIG. 7) applied can also be calculated from the statistical data specific to the camera 100 and/or the lens 110 coupled to the camera 100.

Furthermore, the method 500 shown in FIG. 8 can include a functional block 550 to determine a lens position and its corresponding motor position by selecting a maximum focus measure value among the calculated focus measure values. As stated above, a maximum focus measure value represents a lens position for a clearest image. A maximum focus measure value represents a maximum sum of window evaluation values, which means a best combined clearness for all of the image focusing windows. The weights applied when aggregating the window evaluations values can give special attention to a main imaging region on statistic bases.

Figure 9:
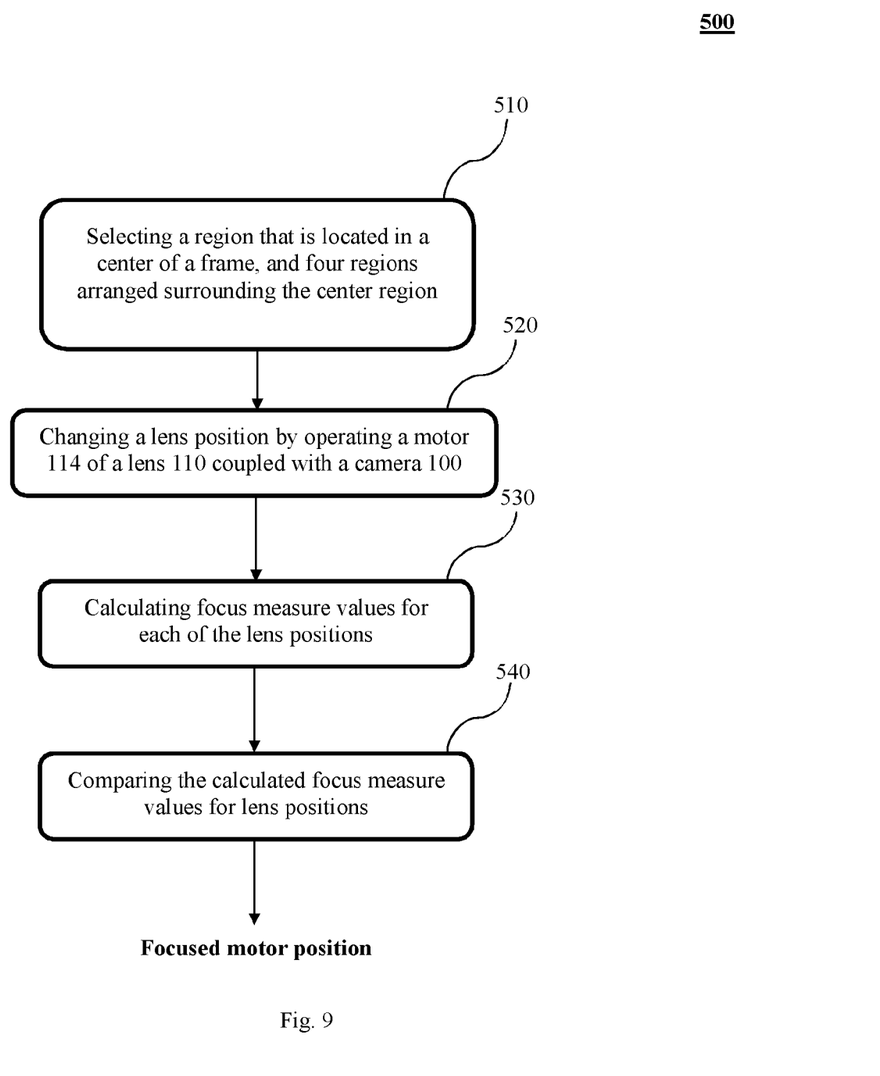
FIG. 9 is an exemplary flowchart illustrating another alternative embodiment of the method of FIG. 6 with a specific selection of image focusing windows.

FIG. 9 illustrates another alternative embodiment of the method 500 of FIG. 6, FIG. 7 or FIG. 8. In FIG. 9, when selecting the image focusing windows, a set of five built-in regions, including one in the center of an image frame and the other four arranged surrounding the center region, are selected as the set of image focusing windows. Preferably, the four surrounding image focusing windows are centered at intersections of two horizontal trisecting lines and two vertical trisecting lines of the image frame. Statistically, a main imaging object is more likely found in one or more of those five regions.

In an embodiment of the method 500 of FIG. 9, the controller 140 (shown in FIG. 5) calculates focus measure values, at 530. The focus measure values can be calculated, at 530, in the manner set forth above with reference to FIG. 7. Referring back to FIG. 7, for example, when performing the calculations at 530, the controller 140 can calculate a window evaluation value and applies a respective weight for each of the five image focusing windows at 531 and 532.

Then, the controller 140 can sum the weighted window evaluation values for the five image focusing windows at 534 to provide a weighted sum of window evaluation values. At 535, the weight sum of window evaluation values can be divided with a total area of the five image focusing windows to provide a focus measure value for the lens position.

In a preferred embodiment of the method 500, an image frame is divided into sixteen rows and sixteen columns (16*16) to form two hundred, fifty-six subareas each having a uniform area. The image focusing window located the center takes four of those two hundred, fifty-six subareas, and any of the other four image focusing windows takes one subarea. For example, in a typical four thousand, ninety-six by two hundred, forty-eight (4096*2048) pixel image frame, the center image focusing window is preferably selected having five hundred, twelve by two hundred, fifty-six (512*256) pixels. Any of the other four image focusing windows is selected having two hundred, fifty-six by one hundred, twenty-eight (256*128) pixels.

As described with reference to FIG. 4, the result focus curve by the approach of the preferred embodiments is much sharper than the focus curve obtained by the general multi-region selection approach. In addition, because the approach conducts calculations only against selected image focusing windows, the amount of calculations can be controlled and limited, which makes the embodiments applicable for video applications.

Figure 10:
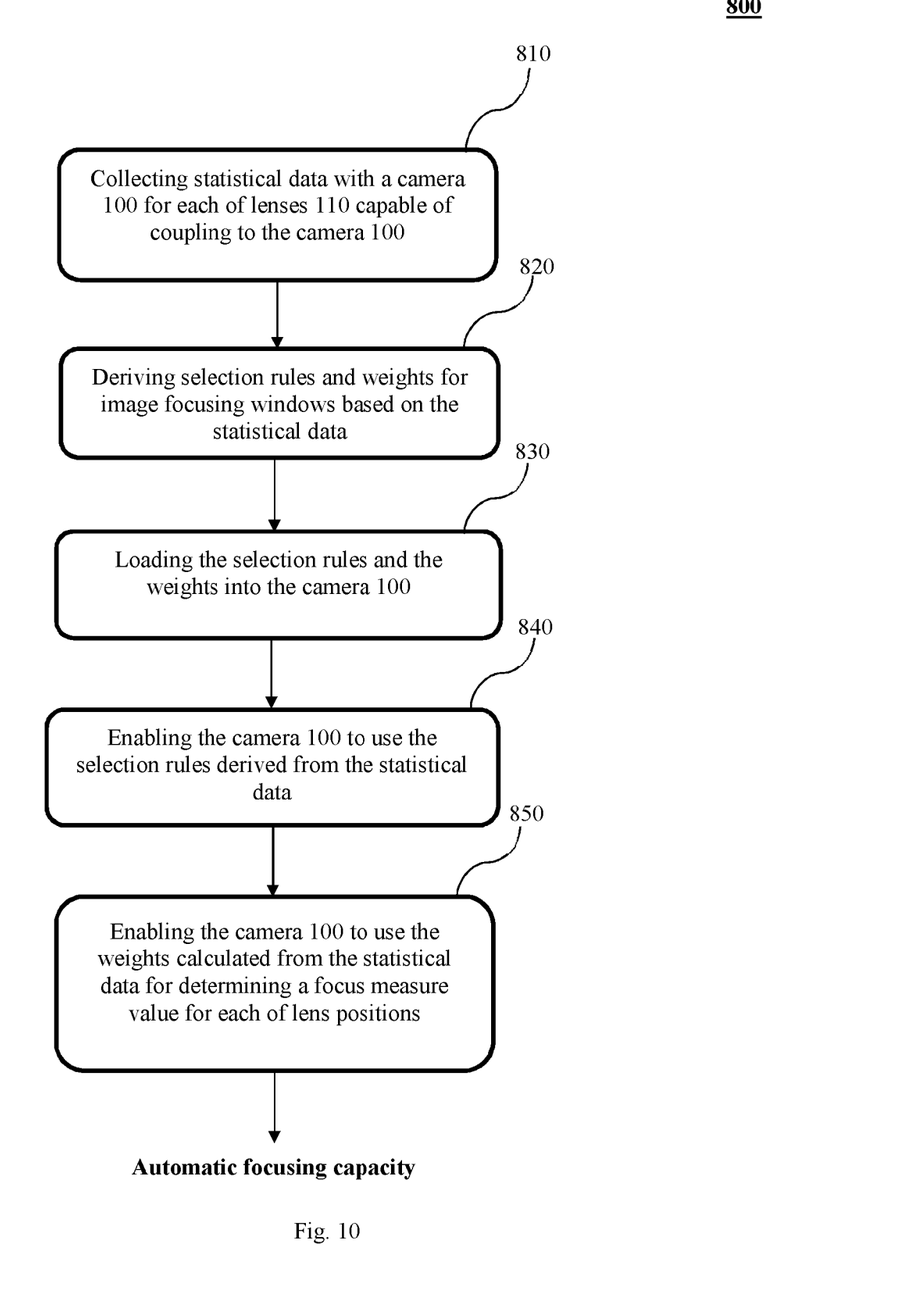
FIG. 10 is an exemplary top-level flowchart illustrating an embodiment of a method for manufacturing an imaging device with the automatic focusing capacity illustrated in FIG. 6, FIG. 8 or FIG. 9.

Another aspect of this disclosure, as illustrated in FIG. 10, is a method 800 for manufacturing the camera 100 (shown in FIG. 5). A first step of the method 800 is to collect statistical data specifically to the camera 100 for each of the lenses 110 (shown in FIG. 5), at 810. The statistical data include probabilities for a main imaging region to fall into each region of an image frame and/or a ratio of the main imaging region to the total area of a specific region. Then, at 820, one or more sets of rules for selecting image focusing windows are summarized and derived from the collected statistical data. In addition, at 820, weights associated with each of the image focusing windows within each set of image focusing windows are also calculated based on the same statistical data.

At 830 of FIG. 10, the derived selection rules and the calculated weights are loaded into the camera 100 (show in FIG. 1). Next, at 840, the camera 100 is enabled to use the loaded selection rules, via the controller 140, to select image focusing windows when performing a focusing operation. Functional block 840 includes adding necessary hardware and/or software to make the controller 140 (shown in FIG. 5) to have the capacity to utilize the loaded selection rules. Finally, at 850, the camera 100 is enabled to use the loaded weights, via the controller 140, to calculate focus measure values when performing a focusing operation. Functional block 850 includes adding necessary hardware and/or software to make the controller 140 (shown in FIG. 5) to have the capacity to utilize the loaded weights when performing a focusing operation.

A last aspect of this disclosure, as illustrated in FIG. 5, is a camera 100 using any of the embodiments illustrated in FIG. 6, FIG. 7, FIG. 8 or FIG. 9. The camera 100 is capable of coupling with a lens 110. A controller 140 of the camera 100 has access to one or more sets of image focusing window selection rules. The rules are summarize and/or derived from statistical data specific to the camera 100 and each lens 110 which is able to be coupled with the camera 100. The controller 140 can use the one or more sets of image focusing window selection rules in selecting a set of image focusing windows when focusing a picture. In a preferred embodiment, the controller 140 can also have access to one set or more sets of weights, calculated based on the statistical data, in calculating a focus measure value for each lens position. Each lens position corresponds to a motor position selected from a plurality of different motor positions. In another preferred embodiment, the controller 140 can select a motor position, which corresponds to a maximum focus measure value of all calculated focus measure values.

Although the system and method have been described with reference to a camera for illustrative purpose only, the above described embodiments may apply to any conventional or nonconventional type of imaging device that is capable of automatic image focusing with a lens. The lens can be either an optical lens or an electronic lens. Typical imaging devices include cameras which can couple with lenses and video recorders with autofocusing capacities. However, the embodiments of this disclosure are not limited to those particular applications.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for automatic focusing a camera having a lens, comprising:
   selecting a set of image focusing windows based on statistical data specific to the camera and the lens;
   calculating a focus measure value for each lens position of a plurality of lens positions via the set of image focusing windows; and
   comparing the calculated focus measure values of the plurality of lens positions in order to select an optimal lens position.

2. The method of claim 1, wherein said calculating the focus measure value comprises determining the focus measure values based on a window evaluation value and a respective weight for each of the image focusing windows.

3. The method of claim 2, wherein said selecting the set of image focusing windows comprises choosing the set of image focusing windows based on one or more sets of image focusing window selection rules.

4. The method of claim 3, wherein said choosing the set of image focusing windows comprises selecting the set of image focusing windows based on built-in rules derived from the statistical data.

5. The method of claim 4, further comprising selecting the respective weight, derived from the statistical data, for each of the image focusing windows.

6. The method of claim 2, wherein said selecting the set of image focusing windows further comprises selecting five image focusing windows.

7. The method of claim 6, wherein said selecting the five image focusing windows consisting selecting a region located in a center of an image frame and four surrounding regions centered at intersections of two horizontal trisecting lines and two vertical trisecting lines of the image frame.

8. The method of claim 7, wherein said selecting the region located in the center comprises selecting an area of the center region being greater than any area of the surrounding regions.

9. The method of claim 8, wherein said calculating the focus measure value further comprises:
   calculating a weighted window evaluation value for each of the five image focusing windows; and
   aggregating the calculated weighted window evaluation values to provide a weighted sum of window evaluation values.

10. The method of claim 9, wherein said calculating the focus measure value further comprises dividing the weighted sum of window evaluation values by a total area of the five image focusing windows.

11. The method of claim 10, further comprising changing the lens position by operating a motor of the lens and determining a motor position with the lens position corresponding to a maximum focus measure value.

12. The method of claim 1, wherein said calculating the focus measure value comprises calculating a weighted window evaluation value for each of the image focusing windows within the set of image focusing windows.

13. The method of claim 12, wherein said calculating the focus measure value comprises aggregating the calculated weighted window evaluation values to provide a weighted sum of window evaluation values.

14. The method of claim 13, wherein said calculating the focus measure value comprises dividing the weighted sum of window evaluation values by a total area of the set of image focusing windows to provide the focus measure value for the lens position.

15. A method for automatic focusing a camera having a lens, comprising:
   selecting a set of image focusing windows based on one or more sets of image
   focusing window selection rules, being based on statistical data specific to the camera and the lens;
   selecting respective weights, derived from the statistical data, for each of the selected image focusing windows;
   calculating focus measure values, based on each of window evaluation values and a respective weight for image focusing windows within the set of image focusing windows, for each lens position of a plurality of lens positions;
   comparing the calculated focus measure values of the plurality of lens positions in order to select an optimal lens position; and
   determining a motor position with the lens position corresponding to a maximum focus measure value.

16. An imaging device capable of automatic focusing, comprising:
   a controller having access to one or more sets of image focusing window selection rules being derived from statistical data specific to the imaging device and each of a plurality of lenses,
   wherein said controller has access to one or more sets of weights corresponding to each set of image focusing windows defined with the one or more sets of image focusing window selection rules.

17. The imaging device of claim 16, wherein the one or more sets of weights are calculated based on the statistical data.

18. The imaging device of claim 17, wherein said controller is capable of using the image focusing window selection rules for selecting image focusing windows.

19. The imaging device of claim 18, wherein said controller is capable of using the one or more sets of weights for calculating a focus measure value for each of the lens positions when photographing a picture.

20. The imaging device of claim 19, wherein the each of the lens positions corresponds to a motor position of a plurality of different positions of a motor associated with the lens.

21. The imaging device of claim 20, wherein said controller selects, for a specific image frame, a motor position corresponding to a maximum focus measure value.

22. A computer program product for automatic focusing a camera having a lens, the computer program product being encoded on more or more non-transitory machine readable storage media and comprising:
   instruction for selecting a set of image focusing windows based on statistical data specific to the camera and the lens;
   instruction for calculating a focus measure value for each lens position of a plurality of lens positions based upon the set of image focusing windows; and
   instruction for comparing the calculated focus measure values of the plurality of lens positions in order to select an optimal lens position.

23. The computer program product of claim 22, wherein said instruction for selecting the set of image focusing windows comprises instruction for selecting the set of image focusing windows based on one or more sets of image focusing window selection rules, being derived from the statistical data.

24. The computer program product of claim 23, wherein said instruction for calculating the focus measure comprises instruction for selecting respective weights, derived from the statistical data, for each of the selected image focusing windows.

25. The computer program product of claim 24, wherein said instruction for calculating the focus measure value comprises instruction for calculating a weighted window evaluation value for each of the image focusing windows within the set of image focusing windows.

26. The computer program product of claim 25, wherein said instruction for calculating the focus measure value comprises instruction for aggregating the calculated weighted window evaluation values to provide a weighted sum of window evaluation values.

27. The computer program product of claim 26, wherein said instruction for calculating the focus measure value comprises instruction for dividing the weighted sum of window evaluation values by a total area of the set of image focusing windows to get the focus measure value for the lens position.

28. The computer program product of claim 27, further comprising instruction for determining a motor position with the lens position corresponding to a maximum focus measure value.

* * * * *